United States Patent
Martchenko (10) Patent No.: US 8,886,787 B2
(45) Date of Patent: Nov. 11, 2014

(54) NOTIFICATION FOR A SET OF SESSIONS USING A SINGLE CALL ISSUED FROM A CONNECTION POOL

(75) Inventor: Serguei V. Martchenko, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1152 days.

(21) Appl. No.: 12/393,051

(22) Filed: Feb. 26, 2009

(65) Prior Publication Data

US 2010/0217872 A1    Aug. 26, 2010

(51) Int. Cl.
| | |
|---|---|
| *G06F 13/00* | (2006.01) |
| *G06F 15/16* | (2006.01) |
| *G06F 15/173* | (2006.01) |
| *G06F 15/177* | (2006.01) |
| *G06F 9/54* | (2006.01) |
| *H04L 12/26* | (2006.01) |
| *H04L 12/24* | (2006.01) |
| *H04L 29/08* | (2006.01) |
| *H04L 29/06* | (2006.01) |

(52) U.S. Cl.
CPC ............ *G06F 9/547* (2013.01); *H04L 43/0817* (2013.01); *H04L 41/046* (2013.01); *H04L 67/02* (2013.01); *H04L 67/40* (2013.01); *H04L 67/32* (2013.01); *H04L 43/00* (2013.01); *H04L 29/06* (2013.01); *H04L 67/42* (2013.01); *H04L 67/14* (2013.01); *H04L 67/148* (2013.01); *H04L 67/147* (2013.01)
USPC ........... 709/224; 709/217; 709/220; 719/318; 719/330

(58) Field of Classification Search
CPC ....... H04L 67/147; H04L 67/14; H04L 29/06; H04L 67/02; H04L 67/42; H04L 43/00; H04L 41/046; H04L 43/0817; H04L 67/40; H04L 67/32; G06F 9/547; G06F 17/30368
USPC ........... 709/220, 217, 224; 719/313, 330, 318
See application file for complete search history.

(56) References Cited

U.S. PATENT DOCUMENTS

| | | | | |
|---|---|---|---|---|
| 5,553,242 | A | * | 9/1996 | Russell et al. ................ 709/227 |
| 5,617,570 | A | * | 4/1997 | Russell et al. ................ 719/312 |

(Continued)

FOREIGN PATENT DOCUMENTS

| | | | | |
|---|---|---|---|---|
| EP | 1 696 634 | A1 * | 8/2006 | .............. H04L 29/08 |

OTHER PUBLICATIONS

"OCI Programming Advanced Topics", Oracle Call Interface Programmer's Guide, last accessed Mar. 2, 2009, 71 pages, 11g Release 1 (11.1), accessible at <<http://download.oracle.com/docs/cd/B28359_01/appdev.111/b28395/oci09adv.htm#i452584>>.

(Continued)

*Primary Examiner* — Daniel C Murray
(74) *Attorney, Agent, or Firm* — Louise Bowman; Jim Ross; Micky Minhas (57) ABSTRACT

A server-to-server notification model that employs a connection pool such that an asynchronous request issued from the pool can access any session of the remote server for pending notifications on all of the sessions. Only one asynchronous request (or call) is issued to the remote server for all sessions in the connection pool, and the call is completed if any notifications to any participating sessions occur on the remote server. When the asynchronous request completes, the returned data provides a set of the sessions that have pending notifications.

20 Claims, 8 Drawing Sheets

(56) References Cited

U.S. PATENT DOCUMENTS

| | | | | |
|---|---|---|---|---|
| 5,721,825 | A * | 2/1998 | Lawson et al. | 709/203 |
| 5,761,507 | A * | 6/1998 | Govett | 718/101 |
| 6,105,067 | A * | 8/2000 | Batra | 709/227 |
| 6,185,613 | B1 * | 2/2001 | Lawson et al. | 709/224 |
| 6,230,198 | B1 * | 5/2001 | Dawson et al. | 709/224 |
| 6,292,825 | B1 * | 9/2001 | Chang et al. | 709/206 |
| 6,338,089 | B1 * | 1/2002 | Quinlan | 709/227 |
| 6,356,930 | B2 * | 3/2002 | Garg | 709/201 |
| 6,477,569 | B1 * | 11/2002 | Sayan et al. | 709/223 |
| 6,480,883 | B1 * | 11/2002 | Tsutsumitake | 709/203 |
| 6,487,581 | B1 * | 11/2002 | Spence et al. | 709/203 |
| 6,523,027 | B1 * | 2/2003 | Underwood | 1/1 |
| 6,633,914 | B1 * | 10/2003 | Bayeh et al. | 709/227 |
| 6,813,635 | B1 * | 11/2004 | Jorgenson | 709/225 |
| 6,862,628 | B2 * | 3/2005 | Moore et al. | 709/236 |
| 6,920,461 | B2 * | 7/2005 | Hejlsberg et al. | 1/1 |
| 6,988,140 | B2 * | 1/2006 | Chintalapati et al. | 709/227 |
| 7,058,892 | B1 * | 6/2006 | MacNaughton et al. | 715/738 |
| 7,080,126 | B2 * | 7/2006 | Srivastava et al. | 709/206 |
| 7,080,145 | B2 * | 7/2006 | Srivastava et al. | 709/226 |
| 7,089,567 | B2 * | 8/2006 | Girardot et al. | 719/330 |
| 7,165,249 | B2 | 1/2007 | Potter et al. | |
| 7,222,179 | B2 * | 5/2007 | Srivastava et al. | 709/226 |
| 7,263,554 | B2 * | 8/2007 | Srivastava et al. | 709/224 |
| 7,337,226 | B2 * | 2/2008 | Saha et al. | 709/226 |
| 7,418,506 | B1 * | 8/2008 | Achtermann et al. | 709/227 |
| 7,451,454 | B2 * | 11/2008 | Chen et al. | 719/318 |
| 7,631,083 | B2 * | 12/2009 | Srivastava et al. | 709/226 |
| 7,657,450 | B2 * | 2/2010 | Amit et al. | 705/7.26 |
| 7,702,796 | B2 * | 4/2010 | Shen et al. | 709/227 |
| 7,711,782 | B2 * | 5/2010 | Kim et al. | 709/206 |
| 7,747,717 | B2 * | 6/2010 | Colrain | 709/223 |
| 7,801,978 | B1 * | 9/2010 | Susai et al. | 709/224 |
| 7,805,422 | B2 * | 9/2010 | Fang et al. | 707/702 |
| 7,805,527 | B2 * | 9/2010 | Stafie et al. | 709/229 |
| 7,809,848 | B1 * | 10/2010 | McDougall et al. | 709/230 |
| 7,839,299 | B2 * | 11/2010 | Hirose et al. | 340/12.22 |
| 7,861,174 | B2 * | 12/2010 | Krasnoiarov et al. | 715/736 |
| 7,953,860 | B2 * | 5/2011 | Colrain et al. | 709/227 |
| 7,962,630 | B2 * | 6/2011 | Krishnaswamy et al. | 709/228 |
| 7,962,636 | B2 * | 6/2011 | Stafie et al. | 709/229 |
| 8,041,821 | B2 * | 10/2011 | Burckart et al. | 709/227 |
| 8,065,365 | B2 * | 11/2011 | Saxena et al. | 709/204 |
| 8,145,759 | B2 * | 3/2012 | Bhogi et al. | 709/226 |
| 8,149,845 | B2 * | 4/2012 | Lefebvre | 370/395.4 |
| 8,244,865 | B2 * | 8/2012 | Burke et al. | 709/226 |
| 8,621,031 | B2 * | 12/2013 | Desai | 709/217 |
| 8,655,853 | B2 * | 2/2014 | Kuersch et al. | 707/684 |
| 8,713,186 | B2 * | 4/2014 | Chidambaran et al. | 709/227 |
| 2002/0091853 | A1 * | 7/2002 | Moore et al. | 709/236 |
| 2002/0116248 | A1 * | 8/2002 | Amit et al. | 705/9 |
| 2002/0156812 | A1 * | 10/2002 | Krasnoiarov et al. | 707/513 |
| 2003/0167277 | A1 * | 9/2003 | Hejlsberg et al. | 707/102 |
| 2004/0088413 | A1 * | 5/2004 | Bhogi et al. | 709/226 |
| 2004/0221031 | A1 * | 11/2004 | Desai | 709/224 |
| 2004/0237042 | A1 * | 11/2004 | Murray et al. | 715/530 |
| 2005/0021848 | A1 * | 1/2005 | Jorgenson | 709/238 |
| 2005/0038772 | A1 * | 2/2005 | Colrain | 707/1 |
| 2005/0038801 | A1 * | 2/2005 | Colrain et al. | 707/100 |
| 2005/0080930 | A1 * | 4/2005 | Joseph | 709/248 |
| 2005/0262183 | A1 | 11/2005 | Colrain et al. | |
| 2006/0004597 | A1 * | 1/2006 | Charters et al. | 705/1 |
| 2006/0044106 | A1 * | 3/2006 | Hirose et al. | 340/3.54 |
| 2006/0069702 | A1 * | 3/2006 | Moeller et al. | 707/200 |
| 2006/0146877 | A1 | 7/2006 | Srivastava | |
| 2006/0156398 | A1 * | 7/2006 | Ross et al. | 726/22 |
| 2006/0195456 | A1 * | 8/2006 | Fang et al. | 707/100 |
| 2006/0195591 | A1 * | 8/2006 | Kim et al. | 709/227 |
| 2007/0006285 | A1 * | 1/2007 | Stafie et al. | 726/4 |
| 2007/0190978 | A1 * | 8/2007 | White et al. | 455/412.1 |
| 2007/0268910 | A1 * | 11/2007 | Shen et al. | 370/395.21 |
| 2008/0228923 | A1 * | 9/2008 | Chidambaran et al. | 709/227 |
| 2008/0275956 | A1 * | 11/2008 | Saxena et al. | 709/206 |
| 2009/0158298 | A1 * | 6/2009 | Saxena et al. | 719/318 |
| 2009/0260023 | A1 * | 10/2009 | Murthy et al. | 719/330 |
| 2009/0300182 | A1 * | 12/2009 | Ueno et al. | 709/226 |
| 2010/0318604 | A1 * | 12/2010 | Stafie et al. | 709/203 |
| 2011/0307544 | A1 * | 12/2011 | Lotlikar et al. | 709/203 |

OTHER PUBLICATIONS

"Connection Pooling", WebSphere Application Server, Version 5.1.1, last updated Sep. 21, 2008, last accessed Mar. 2, 2009, 3 pages, accessible at <<http://publib.boulder.ibm.com/infocenter/wasinfo/v5r1//index.jsp?topic=/com.ibm.websphere.base.doc/info/aes/ae/cdat_conpool.html>>.

"What is pgpool-II?", last updated Mar. 1, 2009, last accessed Mar. 2, 2009, 2 pages, accessible at <<http://pgpool.projects.postgresql.org/>>.

"Developing Enterprise Applications", Oracle9iAS TopLink Foundation Library Guide, last accessed Mar. 2, 2009, 51 pages, Release 2 (9.0.3), accessible at <<http://download.oracle.com/docs/cd/A97688_16/toplink.903/b10064/enterpri.htm>>.

"Process Architecture", Oracle Database Concepts, last accessed Mar. 2, 2009, 24 pages, 11 g Release 1 (11.1), accessible at <<http://download.oracle.com/docs/cd/B28359_01/server.111/b28318/process.htm>>.

Siva Visveswaran, "Dive into Connection Pooling with J2EE", Manage Access to Shared, Server-Side Resources for High Performance, Reprinted from JavaWorld, Oct. 2000, last accessed Mar. 2, 2009, 5 pages, accessible at <<http://java.sun.com/developer/technicalArticles/J2EE/pooling/>>.

* cited by examiner

NOTIFICATION FOR A SET OF SESSIONS USING A SINGLE CALL ISSUED FROM A CONNECTION POOL

BACKGROUND

In server-to-server communications when multiple sessions are created, multiple asynchronous requests (e.g., remote procedure call (RPC) calls) can consume a significant amount of server resources. The requests are mapped one-to-one to the sessions. If a request is made from a local server to a remote server, and the requested information is unavailable (the session is idle), the connection is wasted. The number of active connections can be in the thousands from one process to another process. Reducing the number of requests, such as for change notifications, and responses to those requests will have a substantial performance improvement for the entire system.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture is a server-to-server notification model that employs a connection pool such that an asynchronous request issued from the pool can access any session of the remote server for pending notifications on all of the sessions. Only one asynchronous request (or call) is issued to the remote server for all sessions in the connection pool, and the call is completed if any notifications to any participating sessions occur on the remote server. When the asynchronous request completes, the returned data provides a list of the sessions that have pending notifications.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture improves server-to-server communications where many sessions are created between the servers. Multiple connections (e.g., asynchronous remote procedure calls (RPC's) can consume a significant amount of server resources. Reducing the number of asynchronous requests (e.g., RPC calls) that are made between servers improves performance for the entire system.

The architecture decreases the number of active requests that occur between a middle tier server and a backend server, for example. Consider that in reality where the number of sessions can be in the thousands, the number of active requests can now be reduced significantly by factors at any given point in time, rather than equivalent thousands in current systems.

The architecture obtains a connection from that pool only for the duration that the connection is needed and then releases the connection to the connection pool. A connection pool is a group of connections (e.g., RPC) opened between a local server (and store) and a set of sessions (or session objects) in a remote server, where the sessions are associated with the connections.

There can be several connection pools created on the local server, and each connection pool manages requests and sessions open on a single backend server. Similarly, there can be multiple connection pools created on the backend, each with a set of sessions associated with the connection pool.

In other words, there is no longer a one-to-one mapping established between connections (e.g., RPC handles) and session objects. Each connection in the pool can be used to perform requests with any session associated with the pool.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
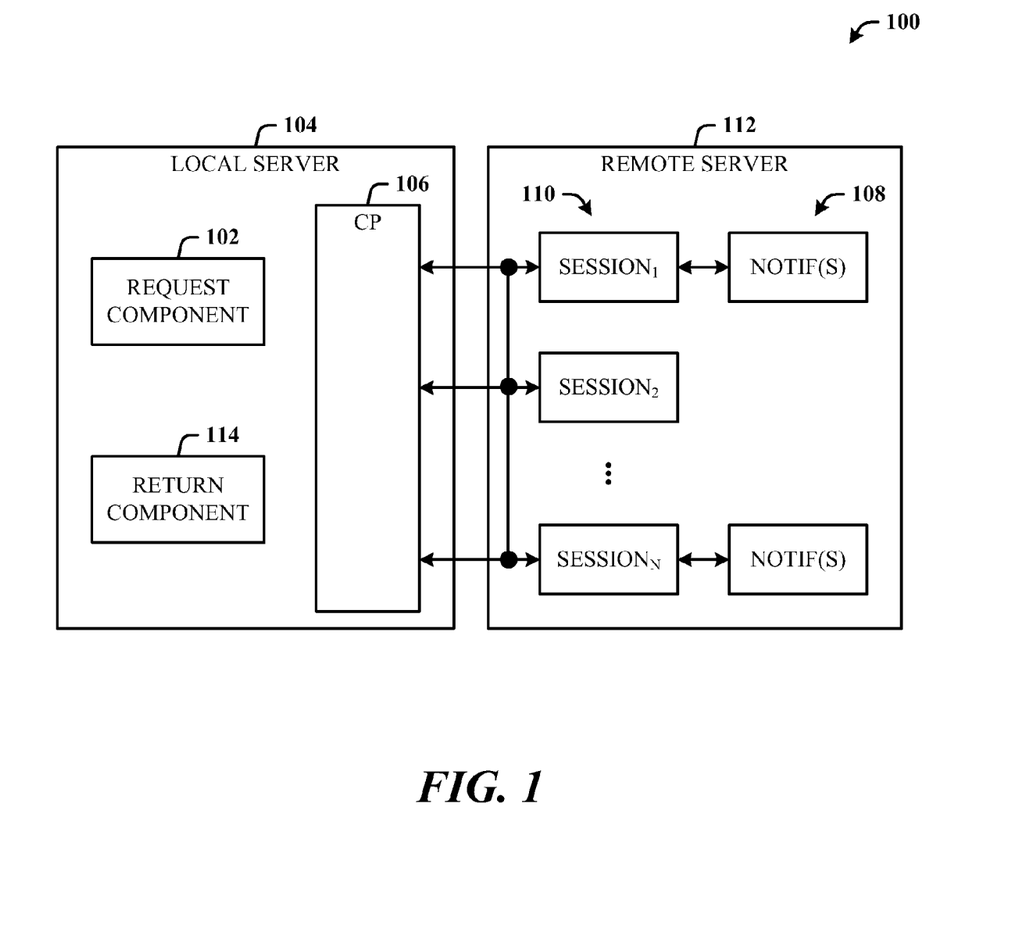
FIG. 1 illustrates a computer-implemented notification system in accordance with the disclosed architecture.

FIG. 1 illustrates a computer-implemented notification system 100 in accordance with the disclosed architecture. The system 100 includes a request component 102 of a local server 104 for processing a request of a connection pool (CP) 106 for one or more change notifications (Notif(s)) 108 in sessions 110 of a remote server 112, and a return component 114 for receiving session data related to the sessions 110 in the remote server 112 having pending notifications. Each request can be used to perform operations with any of the sessions 110 associated with the connection pool 106 (this is represented by the cross-connected nodes on the sessions 110 of the remote server 112). Note that the request component 102 and the return component 114 can be combined as a single software component or module that issues the request and receives the session data.

The session data can be a list of all sessions (e.g., $Session_1$ and $Session_N$, but not $Session_2$) of the remote server 112 having pending change notifications. The return component 114 completes the request in response to receiving the session data. The request can be an RPC handle issued asynchronously by the local server 104 to the remote server 112 for the one or more notifications 108. The local server 104 can be a middle tier messaging server (e.g., email) and the remote server 112 can be a backend messaging server.

The request can be queued in the remote server 112 and completed in response to a notification that occurs after the request is sent. The request can also be queued, and then immediately completed in response to a notification that occurred before the request was sent. The request can use a handle of an RPC connection and the handle is released back to the connection pool 106 upon completion of the request.

Note that the remote server 112 can include the same functionality such that the remote server 112 issues the asynchronous request to the local server 104 for a list of all sessions in the local server 104 that have change notifications.

Figure 2:
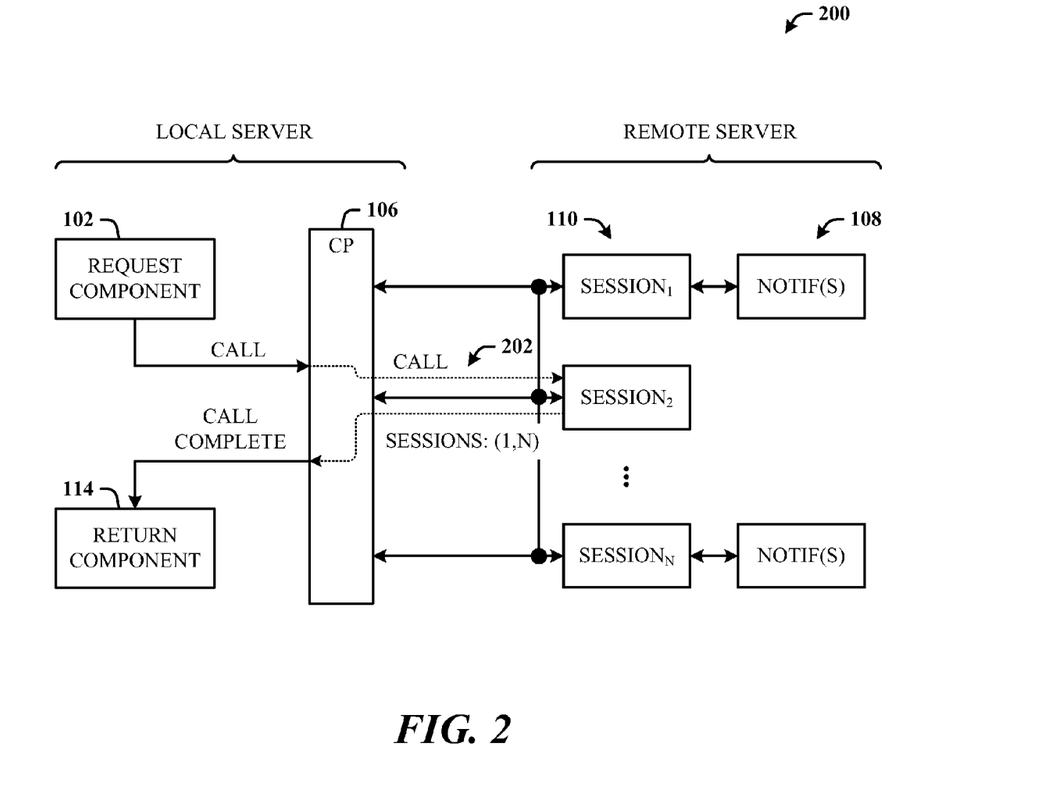
FIG. 2 illustrates an alternative embodiment of a computer-implemented notification system.

FIG. 2 illustrates an alternative embodiment of a computer-implemented notification system 200. The system 200 includes the request component 102 of the local server for issuing a call to the remote server for sessions 110 in the connection pool 106 established between the local and remote servers. The system 200 further includes the return component 114 for completing the call if at least one notification is pending in the sessions 110 of the remote server.

The call is an RPC using a connection 202 in the connection pool 106. The call is issued asynchronously through the CP 106 to the remote server and the connection is released back to the connection pool 106 when the call completed. The completion of the RPC call returns a list, string, expression, etc., (e.g., denoted Sessions: (1,N)) that represents all sessions in the connection pool 106 that have pending notifications. The call can be queued in the remote server, and then completed in response to a notification that occurs in one of the sessions. Alternatively, the call is issued and immediately completed in response to notifications that occurred before the call was issued.

Figure 3:
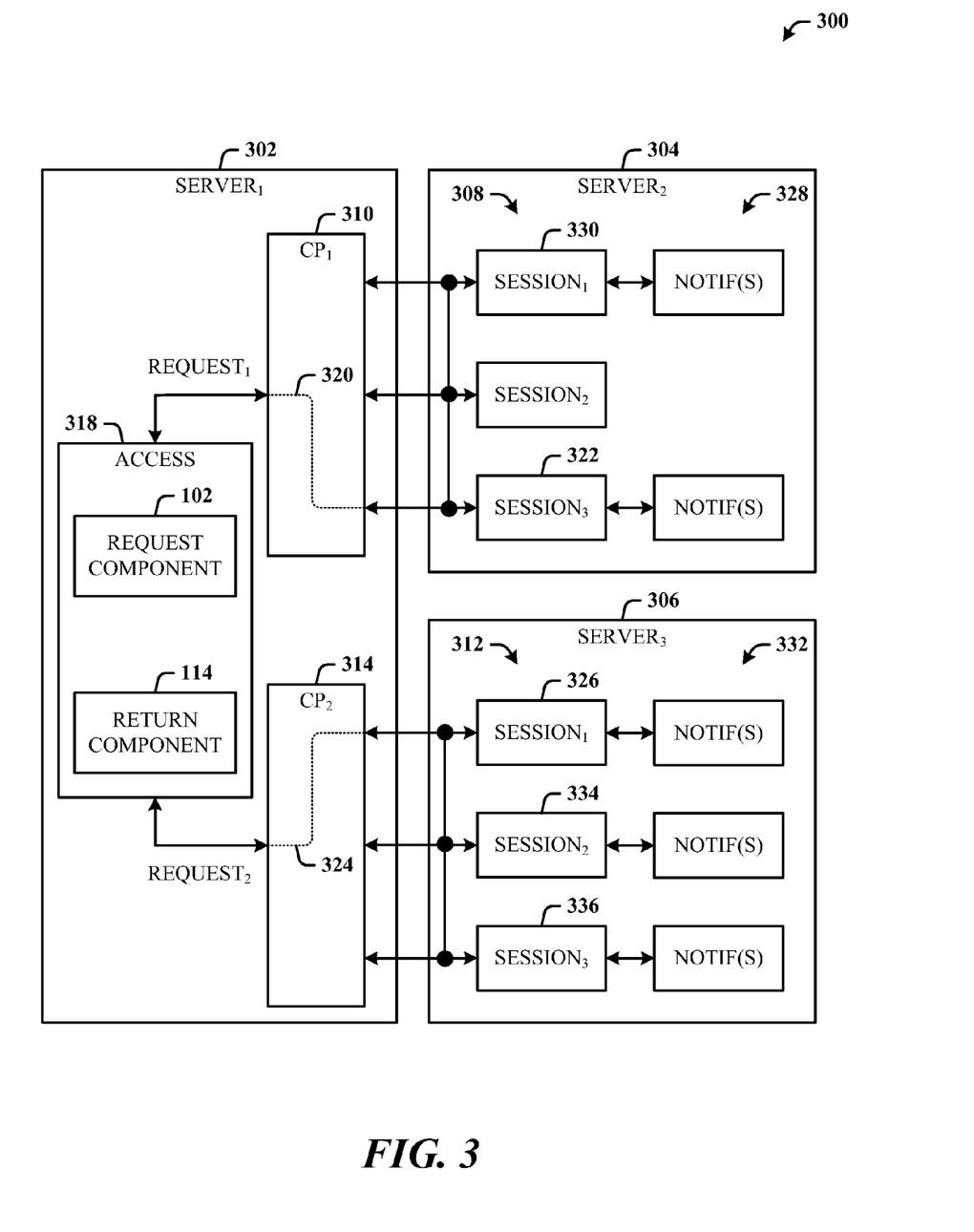
FIG. 3 illustrates a multi-server system where multiple connection pools can be employed.

FIG. 3 illustrates a multi-server system 300 where multiple connection pools can be employed. Here, a first server 302 connects to two servers: a second server 304 and a third server 306, the first server 302 establishing sessions with each of the second server 304 and the third server 306. The connections of the first server 302 to sessions 308 of the second server 304 form a first connection pool (CP) 310, and the connections of the first server 302 to sessions 312 of the third server 306 form a second connection pool (CP) 314. The request component 102 and return component 114 can be a single access component 318 for sending requests (e.g., RPC's) and receiving completed requests (e.g., completed RPC's).

The access component 318 can send separate single requests to each of the servers (304 and 306) for the status of change notifications. In other words, a first request (denoted Request$_1$) from the access component 318 can be sent over a connection 320 selected from the first connection pool 310 to a third session 322 (denoted Session$_3$) of the second server 304. Similarly, a second request (denoted Request$_2$) from the access component 318 can be sent over a connection 324 selected from the second connection pool 314 to a first session 326 (denoted Session$_1$) of the third server 306.

Since there are already change notifications 328 that are pending for the sessions 308 of the first connection pool 310, the second server 304 replies to the first request with a list of all sessions of the sessions 308 that have pending notifications. Thus, the list that includes identifiers of a first session 330 and the third session 322 of the second server 304 is returned over the same connection 320 to the access component 318. Once the first request is completed, the connection 320 is returned to the first connection pool 310.

Similarly, since there are already change notifications 332 that are pending for the sessions 312 of the second connection pool 314, the third server 306 replies to the second request with a list of all sessions of the sessions 312 that have pending notifications. Thus, the list from the third server 306 includes identifiers of the first session 326, a second session 334, and a third session 336 and is returned over the same connection 324 to the access component 318. Once the second request is completed, the connection 324 is returned to the second connection pool 314.

The first server 302 can be a mid-tier messaging server, for example, and the second and third servers (304 and 306) can be backend messaging servers, or other types of servers.

Figure 4:
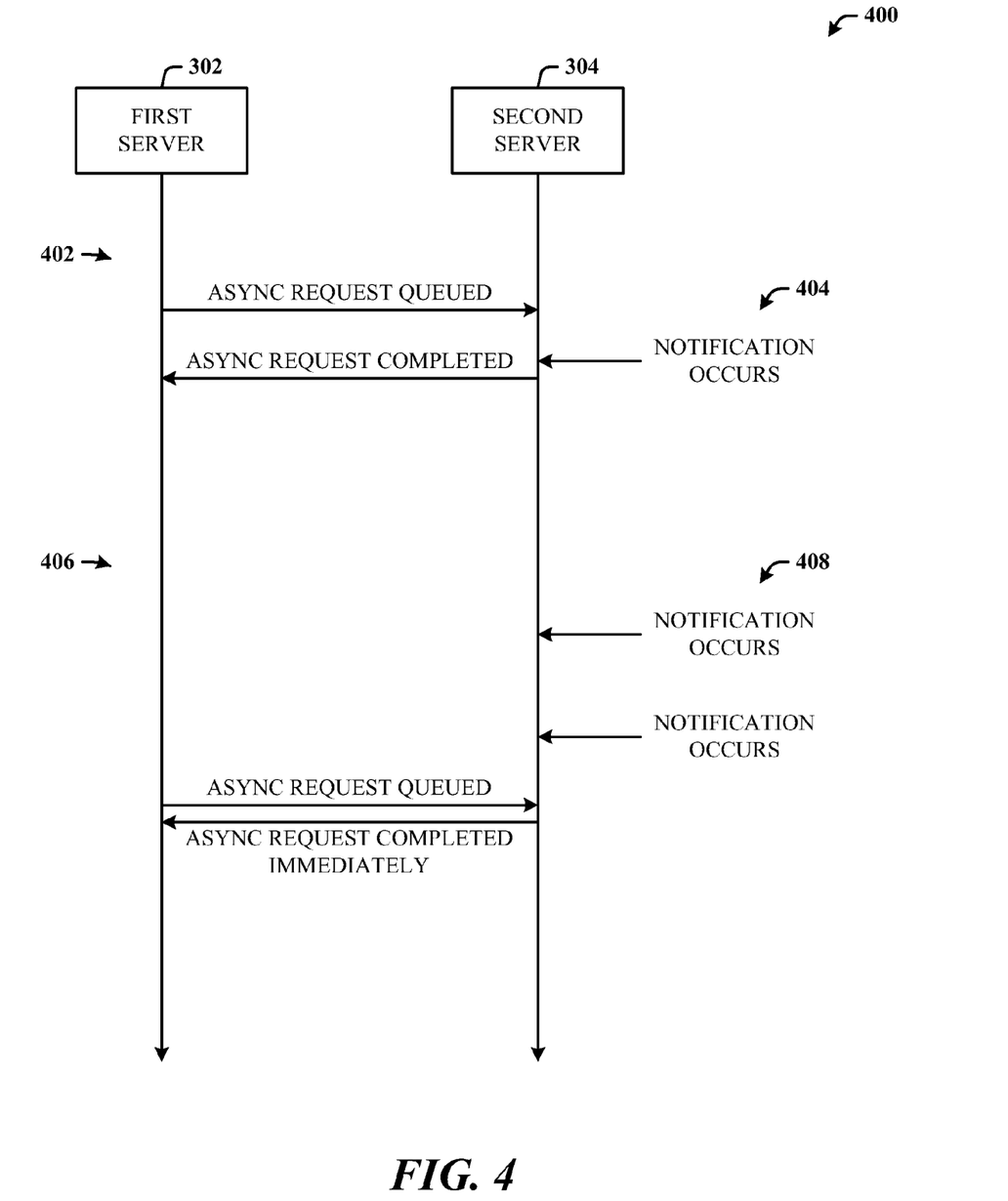
FIG. 4 illustrates a signal flow diagram that represents two scenarios for asynchronous request processing.

FIG. 4 illustrates a signal flow diagram 400 that represents two scenarios for asynchronous request processing. In a first scenario 402, a first asynchronous request from the first server 302 is queued in the second server 304. Since no change notifications are pending, the second server 304 does not reply to the request. At some time later, a notification 404 occurs. In response thereto, the second server 304 sends a list that includes the session identifier for the session for which the notification 404 has occurred, and the request is completed.

In a second scenario 406, two notifications 408 are pending in the second server 304 for one or two sessions. The first server 302 sends a second asynchronous request to the second server 304. The second server 304 then immediately processes the second request, rather than having to wait, as in the first scenario 402. The second server 304 sends a list that includes the session identifier(s) for the session(s) for which the two notifications 408 have occurred, and the request is completed.

Following is a more detailed description of a specific implementation for a middle-tier notification model for RPC as the main transport. A connection pool is then a pool of RPC handles opened between the middle-tier server (e.g., email) and a set of session objects associated with the connections on the backend server(s). On the middle-tier side a session is implemented in a connect object, while on the backend server side a session is implemented in MAPI (messaging application programming interface) session.

There can be several connection pools created on the mid-tier side. Each connection pool manages RPC handles and sessions open on a single backend server. Similarly, there can be multiple connection pools created on the backend server, each backend connection pool having a set of sessions associated with the connection pool.

In other words, there is no longer a one-to-one mapping established between RPC handles and session objects. Each RPC handle in the pool can be used to perform operations with any session associated with the pool. Each session within the pool is identified by a session handle.

An RPC interface is created to manage connection pools and perform operations on the backend (or remote) server. The interface can include three groups of functions: pool connects and disconnects, session creation and closing, and waiting for notifications. The connect and disconnect APIs manage RPC handles in the connection pool. The session creation and closing APIs manage MAPI sessions and execute operations identified by operation codes for an RPC request. The utilization of the operation codes facilitates the use of a single signature of an RPC method to perform various operations on the backend (or remote) server and extends these operations easily with less version-related issues. The notification API is an asynchronous RPC method to inform the connection pool that some of the sessions in the pool have pending notifications.

The session close function can utilize parameters related to an RPC handle from the pool to use for this operation, and the handle of the session in the pool to close.

A pool session RPC function can utilize parameters related to the RPC handle from the pool to use for this operation, the handle of the session to perform the operation, in/out parameter with flags, and so on.

The notification function can take parameters related to the RPC handle from the pool to use for this operation, the out parameter to receive the length of the response data, and the out parameter to receive the response data.

There can be multiple connection pool objects created on the backend server. All connection pool objects are stored in a global mapping table that maps an identifier (e.g., a GUID (globally unique identifier), serial number of a pool created since last server restart, etc.) to the pool. RPC handles from all connection pools can share the same value space, and each RPC handle can be used to identify a connection pool. The pool includes at least one active RPC handle. If a last RPC handle is closed, the pool is destroyed. However, the pool may have no active sessions open, and the pool is not destroyed when the last session is disconnected.

All sessions created within a connection pool are linked to the connection pool. All sessions created in the same pool remain open until closed explicitly, or when a pool is destroyed as a result of the cleanup of server resources allocated to a client, for example.

The pool functionality is implemented by pool, pool reference, and pool manager classes. The manager class is responsible for RPC handle management. The reference class represents a connection pool reference identified by a pool identifier, and the pool class represents the connection pool itself.

When a pool connect request is received, and the pool identifier is a zero identifier, a new pool object is created and a new RPC handle is created. If the pool identifier is not zero, then new handle is created in the pool identified by the pool identifier.

Each handle contains a reference to the pool reference, which in turn contains a reference on the pool itself. Every time a new handle is created, a reference count on the pool reference class is increased by one. Every time a handle is closed, either explicitly or via RPC cleanup, a reference on the pool reference class is decremented by one. When last reference to the pool reference class instance is released, the instance itself is destroyed and a reference to pool class is released.

When an RPC call is processed and requires access to a connection pool, a reference count on the corresponding pool instance is incremented by one. When the RPC call completes, the reference is decremented by one. When the last reference to the pool instance is released, the instance is destroyed, and all MAPI sessions which are still open under that pool are closed.

Since references on pool reference and pool are maintained independently, it is guaranteed that the pool will remain alive as long as there are outstanding RPC calls which need it.

All operations on the RPC handles and pool reference instances can be protected by a global reader-writer lock. All operations which manipulate the state of the pool instance can be protected by a reader-writer lock on the instance.

In one implementation, the connection pool functionality is available only to the middle-tier server.

There can be multiple connection pools created in the middle tier to allow communication with different backend servers. There is only one connection pool created for any given backend server. Connection pool objects can be identified by the backend server name. A connection pool can be created on demand when a first session to a backend server is created. The connection pool is destroyed either on RPC layer shutdown, or when the RPC layer throws an exception which is fatal for the pool.

If no connection pools exist for the given backend server, a new pool is created. Every time the mid-tier needs to perform an operation, an RPC handle is retrieved from the pool. If there are no free handles in the pool and the pool has not reached its maximum size, a new RPC handle is created and added to the pool. If the pool is at its maximum size, all incoming calls have to wait on the pool semaphore until a handle is returned to the pool.

As a brief overview of notifications, an asynchronous RPC method is used by the mid-tier RPC layer to receive notifications from the backend. When the asynchronous call completes, a list of sessions which have pending notifications is returned. In one implementation, only one asynchronous RPC call is made per connection pool, and the returned notifications are for sessions of the connection pool only.

The store notification infrastructure is used to collect notifications on Logon objects for all sessions opened in a connection pool. The connection pool maintains a list of all sessions handles for the sessions that have notifications that have not yet been sent to the mid-tier server. When an asynchronous RPC call is received, the list is traversed, session handles are packed into the response buffer, and the RPC call completes. If the notification list is empty, the asynchronous call is parked on the connection pool object. The asynchronous call is completed when new notifications occur. If an asynchronous call has been parked for a certain time, and no new notifications occur, the asynchronous RPC call is completed anyway.

With respect to the mid-tier RPC layer, an asynchronous RPC call from the connection pool is issued when a first session in the pool registers for push notification. A single background thread is used to process the response for all connection pools. A completion port is used to wait for the completion of an asynchronous RPC call. Once an asynchronous RPC call is complete, the response data is processed and connect information is added to the notification poll list. Thereafter, notifications are processed and dispatched the same way as before.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
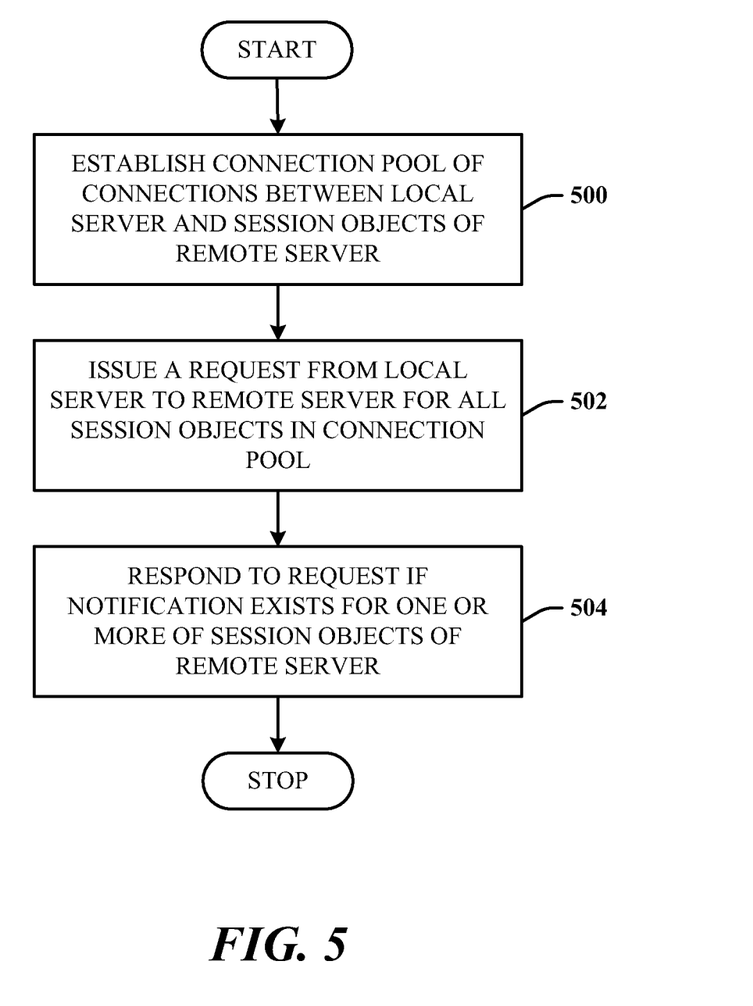
FIG. 5 illustrates a method of processing notifications in servers.

FIG. 5 illustrates a method of processing notifications in servers. At 500, a connection pool of connections is established between a local server and session objects of a remote server. At 502, a request is issued from the local server to the remote server for all session objects in the connection pool. At 504, the request is responded to if a notification exists for one or more of the session objects of the remote server.

Figure 6:
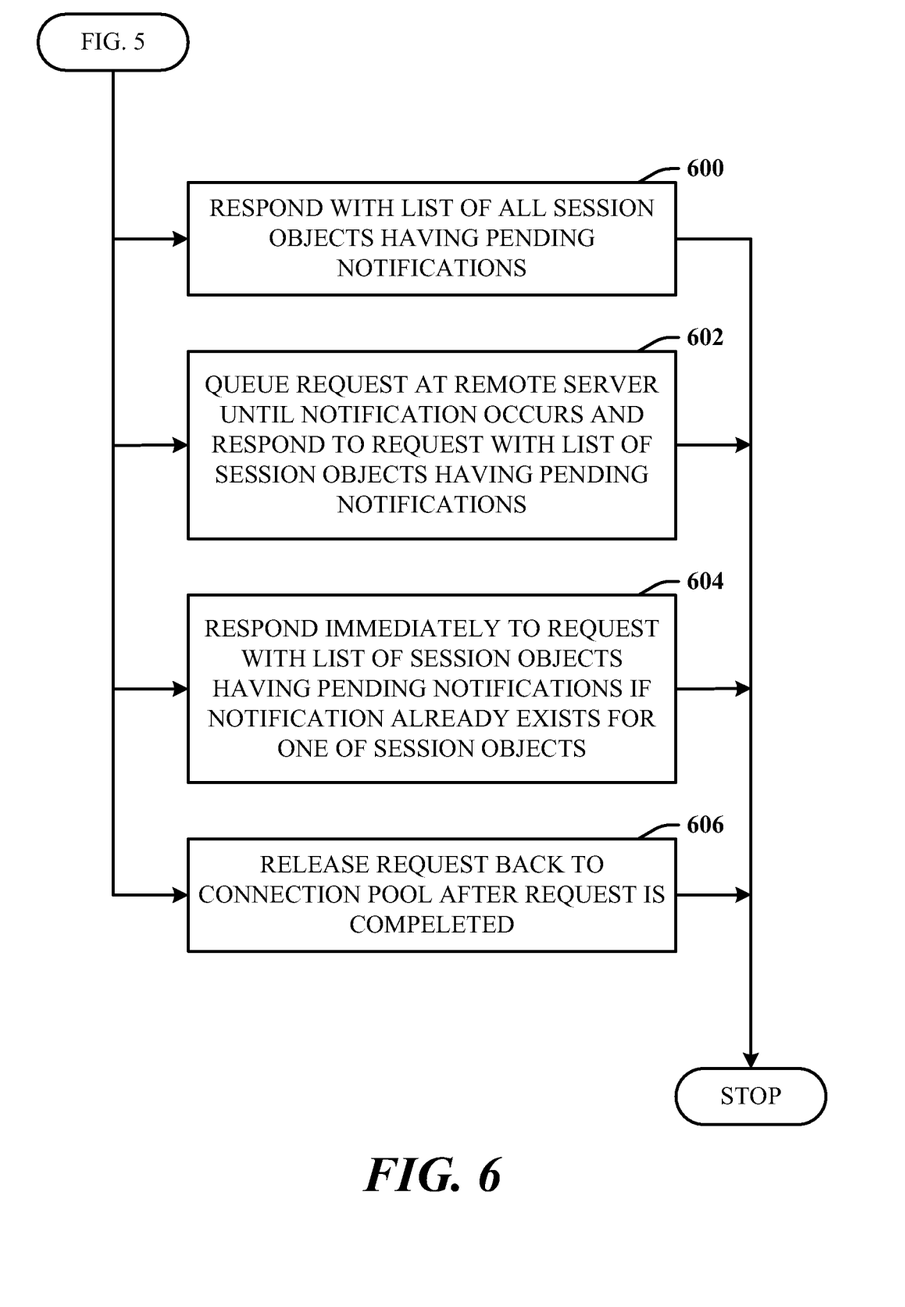
FIG. 6 illustrates alternative aspects of the method of FIG. 5.

FIG. 6 illustrates alternative aspects of the method of FIG. 5. At 600, the remote server responds with a list of all session objects having pending notifications. The request can be an RPC call issued asynchronously by the local server, which is a middle tier messaging server, to the remote server, which is a backend messaging server. Alternatively, at 602, the request is queued at the remote server until a notification occurs; and responds to the request with a list of session objects having pending notifications. Alternatively, at 604, response is immediate to the request with a list of session objects having pending notifications if the notification already exists for one of the session objects. Alternatively, at 606, the request is released back to the connection pool after the request has been completed.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
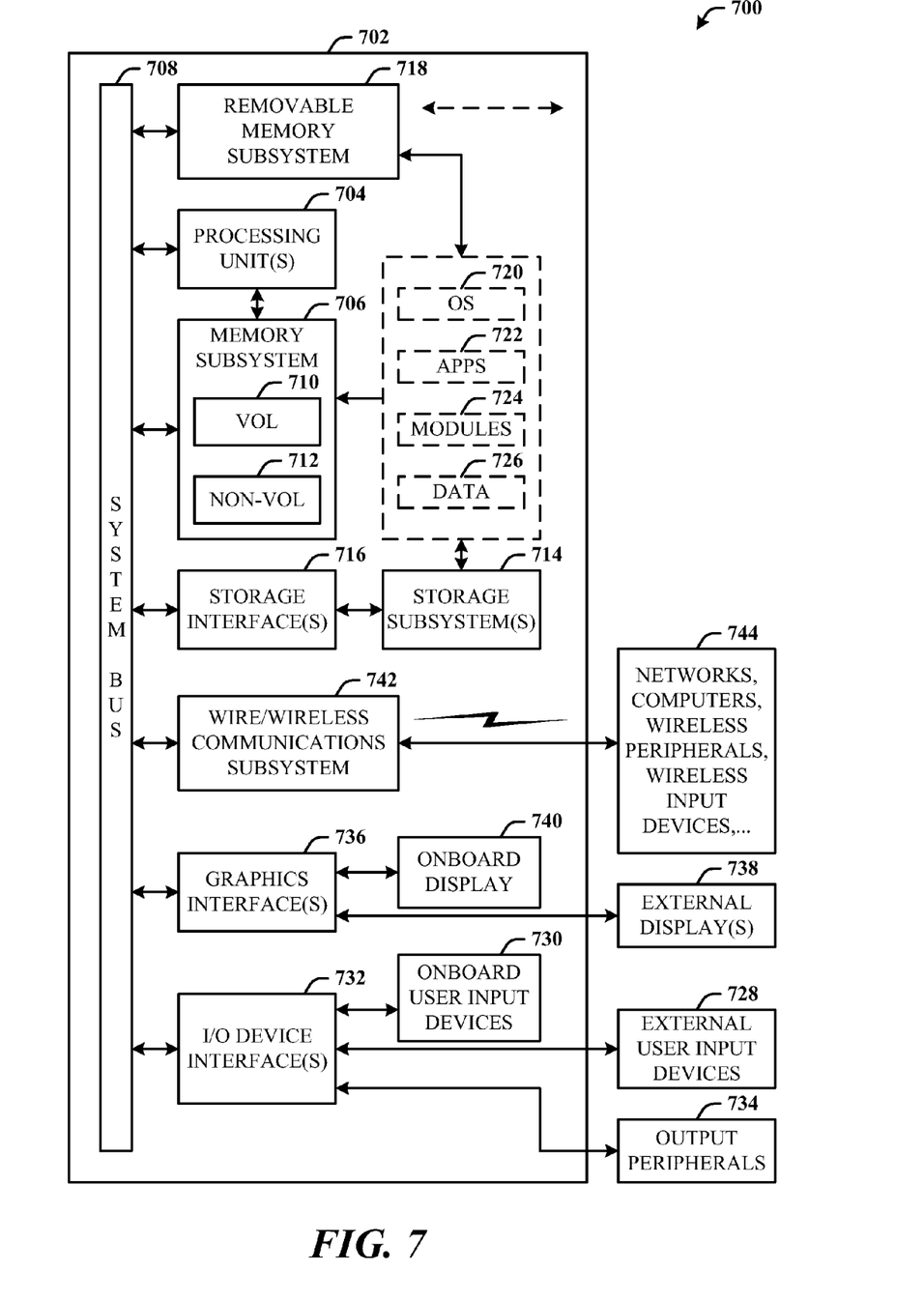
FIG. 7 illustrates a block diagram of a computing system operable to execute server-to-server notification using a connection pool in accordance with the disclosed architecture.

Referring now to FIG. 7, there is illustrated a block diagram of a computing system 700 operable to execute server-to-server notification using a connection pool in accordance with the disclosed architecture. In order to provide additional context for various aspects thereof, FIG. 7 and the following discussion are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704, a system memory 706, and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 706 can include volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the memory subsystem 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes storage subsystem(s) 714 and storage interface(s) 716 for interfacing the storage subsystem(s) 714 to the system bus 708 and other desired computer components. The storage subsystem(s) 714 can include one or more of a hard disk drive (HDD), a magnetic floppy disk drive (FDD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a removable memory subsystem 718 (e.g., flash drive form factor technology), and/or the storage subsystem(s) 714, including an operating system 720, one or more application programs 722, other program modules 724, and program data 726.

Where the computer 702 is utilized as a server, the one or more application programs 722, other program modules 724, and program data 726 can include the entities and components of system 100 of FIG. 1, the entities and components of the system 200 of FIG. 2, the entities and components of the system 300 of FIG. 3, the functionality represented in the flow diagram 400 of FIG. 4, and the methods represented in the flowcharts for FIGS. 5-6, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. Computer readable media can be any available media that can be accessed by the computer 702 and includes volatile and non-volatile media, removable and non-removable media. For the computer 702, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 702, programs, and data using external user input devices 728 such as a keyboard and a mouse. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such a touchpad, microphone, keyboard, etc., where the computer 702 is a portable computer, for example. These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP) using logical connections via a wired/wireless communications subsystem 742 to one or more networks and/or other computers. The other computers can include workstations, servers, routers, personal computers, microprocessor-based entertainment appliance, a peer device or other common network node, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or has other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 8:
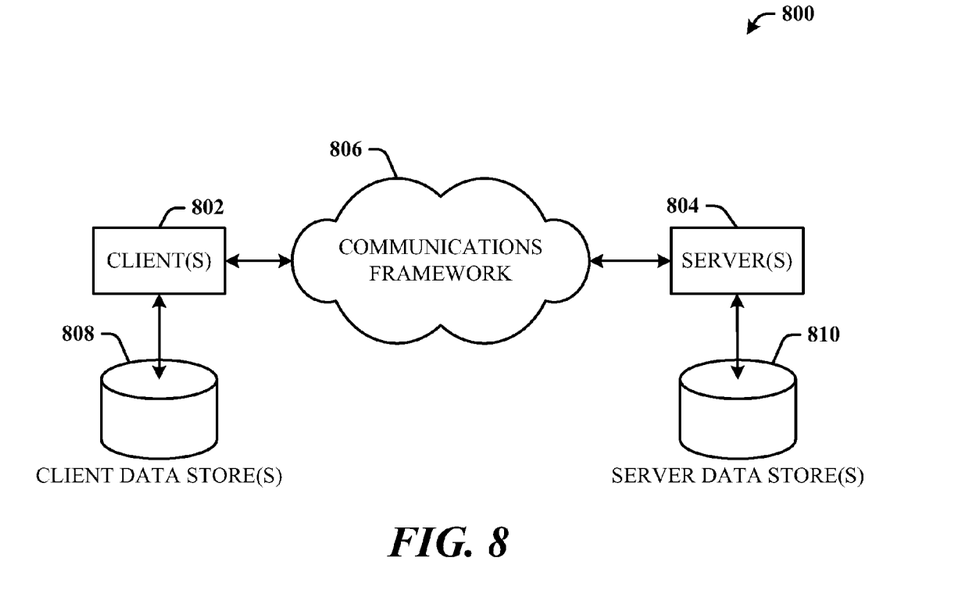
FIG. 8 illustrates a schematic block diagram of a computing environment for server-to-server change notifications using a connection pool.

Referring now to FIG. 8, there is illustrated a schematic block diagram of a computing environment 800 for server-to-server change notifications using a connection pool. The environment 800 includes one or more client(s) 802. The client(s) 802 can be hardware and/or software (e.g., threads, processes, computing devices). The client(s) 802 can house cookie(s) and/or associated contextual information, for example.

The environment 800 also includes one or more server(s) 804. The server(s) 804 can also be hardware and/or software (e.g., threads, processes, computing devices). The servers 804 can house threads to perform transformations by employing the architecture, for example. One possible communication between a client 802 and a server 804 can be in the form of a data packet adapted to be transmitted between two or more computer processes. The data packet may include a cookie and/or associated contextual information, for example. The environment 800 includes a communication framework 806 (e.g., a global communication network such as the Internet) that can be employed to facilitate communications between the client(s) 802 and the server(s) 804.

Communications can be facilitated via a wire (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented notification system comprising:
   a processor for executing computer-executable components; and
   memory storing computer-executable components comprising:
      a request component of a local server for issuing a request for change notifications to a remote server using a connection pool associated with a set of sessions open on the remote server, the request for change notifications issued as a single asynchronous call from the connection pool to the remote server, the connection pool including active handles of connections opened between the local server and session objects on the remote server that are associated with the connections, wherein:
         the connection pool contains a connection pool reference for keeping the connection pool open as long as there are outstanding calls requiring access to the connection pool,
         each active handle contains a reference to the connection pool reference and can be used to perform requests with any session associated with the connection pool, and
         the single asynchronous call uses an active handle selected from the connection pool and can access any open session on the remote server that is included in the set of sessions associated with the connection pool for requesting change notifications from all of the sessions included in the set of sessions associated with the connection pool; and a return component for receiving a list of sessions on the remote server that are included in the set of sessions associated with the connection pool and have pending change notifications.

2. The system of claim 1, wherein the set of sessions associated with the connection pool includes one or more messaging application programming interface (MAPI) sessions.

3. The system of claim 1, wherein the return component completes the single asynchronous call in response to receiving the list.

4. The system of claim 1, wherein the single asynchronous call issued from the connection pool maps to all sessions on the remote server that are included in the set of sessions associated with the connection pool.

5. The system of claim 1, wherein:
the single asynchronous call is a remote procedure call (RPC) issued from the connection pool,
the local server is a middle tier server, and
the remote server is a backend server.

6. The system of claim 5, wherein:
the middle tier server is an email server, and
the backend server is a messaging server.

7. The system of claim 1, wherein:
the active handle used by the single asynchronous call is a remote procedure call (RPC) handle,
the RPC handle contains a reference to the connection pool reference,
the RPC handle is released back to the connection pool upon completion of the single asynchronous call, and
the connection pool reference is decremented.

8. The system of claim 1, wherein:
the single asynchronous call is queued by the remote server when no sessions on the remote server that are included in the set of sessions associated with the connection pool have pending change notifications, and
the remote server responds to a queued asynchronous call after a notification occurs in any session on the remote server that is included in the set of sessions associated with the connection pool.

9. The system of claim 1, wherein:
the single asynchronous call is queued by the remote server, and
the remote server immediately responds to a queued asynchronous call if a change notification is pending in any session on the remote server that is included in the set of sessions associated with the connection pool.

10. A computer storage medium that does not consist of a signal, the computer storage medium storing computer-executable instructions that, when executed, cause a local server to perform a method comprising:
issuing a request for change notifications remote server using a connection pool associated with a set of sessions open on the remote server, the request for change notifications issued as a single asynchronous call from the connection pool to the remote server, the connection pool including active handles of connections opened between the local server and session objects on the remote server that are associated with the connections, wherein:
the connection pool contains a connection pool reference for keeping the connection pool open as long as there are outstanding calls requiring access to the connection pool,
each active handle contains a reference to the connection pool reference and can be used to perform requests with any session associated with the connection pool, and
the single asynchronous call uses an active handle selected from the connection pool and can access any open session on the remote server that is included in the set of sessions associated with the connection pool for requesting change notifications from all of the sessions included in the set of sessions associated with the connection pool; and
receiving a list of all sessions on the remote server that are included in the set of sessions associated with the connection pool and have pending change notifications.

11. The computer storage medium of claim 10, wherein:
the active handle used by the single asynchronous call is a remote procedure call (RPC) handle,
the single asynchronous call is an RPC call issued from the connection pool to the remote server,
the RPC handle contains a reference to the connection pool reference,
the RPC handle is released back to the connection pool upon completion of the single asynchronous call, and
the connection pool reference is decremented.

12. The computer storage medium of claim 10, wherein set of sessions associated with the connection pool includes one or more messaging application programming interface (MAPI) sessions.

13. The computer storage medium of claim 10, wherein:
the single asynchronous call is queued by the remote server when no sessions on the remote server that are included in the set of sessions associated with the connection pool have pending change notifications, and
the remote server responds to a queued asynchronous call after a notification occurs in any session on the remote server that is included in the set of sessions associated with the connection pool.

14. The computer storage medium of claim 10, wherein:
the remote server immediately responds to the single asynchronous call if a change notification is pending in any session on the remote server that is included in the set of sessions associated with the connection pool.

15. A computer-implemented method of notification, comprising:
issuing a request for change notifications to a remote server using a connection pool associated with a set of sessions open on the remote server, the request for change notifications issued as a single asynchronous call from the connection pool to the remote server, the connection pool including active handles of connections opened between a local server and session objects on the remote server that are associated with the connections, wherein:
the connection pool contains a connection pool reference for keeping the connection pool open as long as there are outstanding calls requiring access to the connection pool,
each active handle contains a reference to the connection pool reference and can be used to perform requests with any session associated with the connection pool, and
the single asynchronous call uses an active handle selected from the connection pool and can access any open session on the remote server that is included in the set of sessions associated with the connection pool for requesting change notifications from all of the sessions included in the set of sessions associated with the connection pool; and receiving a list of all sessions on the remote server that are included in the set of sessions associated with the connection pool and have pending change notifications.

16. The method of claim 15, wherein the set of sessions associated with the connection pool includes one or more messaging application programming interface (MAPI) sessions.

17. The method of claim 15, wherein:
the single asynchronous call is a remote procedure (RPC) call issued by the connection pool,
the local server is a middle tier email server, and
the remote server is a backend messaging server.

18. The method of claim 15, wherein:
the single asynchronous call is queued at the remote server when no sessions on the remote server that are included in the set of sessions associated with the connection pool have pending change notifications, and
the remote server responds to a queued asynchronous call after a change notification occurs in any session on the remote server that is included in the set of sessions associated with the connection pool.

19. The method of claim 15, wherein:
the remote server immediately responds to the single asynchronous call if a change notification is pending in any session on the remote server that is included in the set of sessions associated with the connection pool.

20. The method of claim 15, further comprising:
releasing the active handle used by the single asynchronous call back to the connection pool after completion of the single asynchronous call; and
decrementing the connection pool reference.

* * * * *